US012673673B2

(12) United States Patent    (10) Patent No.:   US 12,673,673 B2

Mehta et al.       (45) Date of Patent:    Jul. 7, 2026

---

(54) LANE CHANGE PREDICTION ON HIGHWAYS

(71) Applicant: QUALCOMM Incorporated, San Diego, CA (US)

(72) Inventors: Ashish Biren Mehta, San Diego, CA (US); Monu Surana, San Diego, CA (US); Avdhut Joshi, San Marcos, CA (US); Reuben Manappallil Varghese John, San Diego, CA (US); Chloe Benz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 18/888,869

(22) Filed: Sep. 18, 2024

(65) Prior Publication Data

US 2025/0222924 A1    Jul. 10, 2025

Related U.S. Application Data

(60) Provisional application No. 63/617,980, filed on Jan. 5, 2024.

(51) Int. Cl.
*B60W 30/095*      (2012.01)
*G06N 20/00*      (2019.01)

(52) U.S. Cl.
CPC ......... *B60W 30/0956* (2013.01); *G06N 20/00* (2019.01); *B60W 2554/4041* (2020.02)

(58) Field of Classification Search
CPC ........... B60W 30/095; B60W 30/0956; B60W 30/18163; B60W 2554/4041; G06N 3/045; G06N 20/00

(Continued)

(56) References Cited

U.S. PATENT DOCUMENTS

| | | | | |
|---|---|---|---|---|
| 11,195,418 B1 * | 12/2021 | Hong | ................. | G01C 21/3602 |
| 11,989,020 B1 * | 5/2024 | Bagnell | .................. | G06N 3/045 |

(Continued)

FOREIGN PATENT DOCUMENTS

| | | | | |
|---|---|---|---|---|
| CN | 116061973 A | 5/2023 | | |
| CN | 116246492 A * | 6/2023 | ............. | G08G 1/167 |

(Continued)

OTHER PUBLICATIONS

Messaoud, et al., "Attention Based Vehicle Trajectory Prediction," in IEEE Transactions on Intelligent Vehicles, vol. 6, No. 1, pp. 175-185, Mar. 2021, doi: 10.1109/TIV.2020.2991952 (https://ieeexplore.ieee.org/document/9084255?source=IQplus) (Year: 2021).*

(Continued)

*Primary Examiner* — Atul Trivedi

(74) *Attorney, Agent, or Firm* — Thien T. Nguyen

(57)       ABSTRACT

Disclosed are techniques for drive trajectory prediction. In one or more aspects, an ego vehicle applies a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification, and performs a driving maneuver based on the predicted lane change intention.

28 Claims, 12 Drawing Sheets

800 o Lane waypoints

● Lane classification

☐ Ego history

◯ Target history

◯ Target prediction

(58) Field of Classification Search
USPC .......................................................... 701/301
See application file for complete search history.

(56) References Cited

U.S. PATENT DOCUMENTS

| | | | | |
|---|---|---|---|---|
| 12,371,025 | B2 * | 7/2025 | Chen ..................... | B60W 40/04 |
| 12,415,541 | B1 * | 9/2025 | Jin .................. | B60W 30/18163 |
| 12,525,031 | B2 * | 1/2026 | Smolyanskiy ..... | B60W 60/0011 |
| 12,559,099 | B1 * | 2/2026 | Ye ..................... | B60W 30/0956 |
| 2018/0046191 | A1 | 2/2018 | Keller et al. | |
| 2022/0082403 | A1 * | 3/2022 | Shapira .............. | G01C 21/3602 |
| 2022/0105961 | A1 | 4/2022 | Wang | |
| 2022/0135086 | A1 | 5/2022 | Mahjourian et al. | |
| 2023/0085296 | A1 * | 3/2023 | Liu ......................... | G06N 3/042 |
| | | | | 706/12 |
| 2023/0099494 | A1 * | 3/2023 | Kocamaz .............. | G06V 20/58 |
| | | | | 382/103 |
| 2023/0192074 | A1 * | 6/2023 | Abad .................... | B60W 30/09 |
| | | | | 701/26 |
| 2023/0406360 | A1 * | 12/2023 | Al-Rfou ............ | B60W 60/0027 |
| 2024/0010196 | A1 * | 1/2024 | Leung ................... | B60W 30/09 |
| 2024/0028041 | A1 * | 1/2024 | Klaus ................... | G01S 17/931 |
| 2024/0059285 | A1 * | 2/2024 | Ng ...................... | B60W 50/14 |
| 2024/0070450 | A1 * | 2/2024 | Ju ............................. | G06F 7/57 |
| 2024/0071064 | A1 * | 2/2024 | Chung .................. | G06V 10/82 |
| 2024/0096102 | A1 * | 3/2024 | Popov ................... | G06V 20/56 |
| 2024/0280372 | A1 * | 8/2024 | Abbott .................... | G01S 17/89 |
| 2024/0308550 | A1 | 9/2024 | Peng et al. | |
| 2025/0078531 | A1 * | 3/2025 | Yan ......................... | G06V 10/82 |
| 2025/0222924 | A1 * | 7/2025 | Mehta .............. | B60W 30/0956 |
| 2025/0292459 | A1 * | 9/2025 | Deshmukh .............. | G06T 11/23 |
| 2025/0292460 | A1 * | 9/2025 | Deshmukh .............. | G06T 11/23 |
| 2025/0328752 | A1 * | 10/2025 | Yu ........................... | G06N 3/063 |
| 2025/0368224 | A1 * | 12/2025 | Parasuram ......... | B60W 60/0011 |
| 2026/0073096 | A1 * | 3/2026 | Zhao ........................ | G05D 1/60 |
| 2026/0080692 | A1 * | 3/2026 | Mahdavian ........... | G06V 10/26 |
| 2026/0087267 | A1 * | 3/2026 | Acharya ................ | G06F 40/40 |
| 2026/0087825 | A1 * | 3/2026 | Sadeghigooghari ... | G06V 20/56 |
| 2026/0121773 | A1 * | 4/2026 | Dhingra ............... | H04B 17/328 |

FOREIGN PATENT DOCUMENTS

| | | | | | |
|---|---|---|---|---|---|
| CN | 117325865 | A | * | 1/2024 | ...... B60W 30/18163 |
| CN | 120963695 | A | * | 1/2024 | ............. G06N 3/092 |
| CN | 117807413 | A | * | 4/2024 | ........... G08G 1/0104 |
| CN | 120397005 | A | * | 8/2025 | ............. B60W 50/00 |
| CN | 120963715 | A | * | 11/2025 | ............. G06V 3/092 |
| EP | 4198943 | A1 | * | 6/2023 | ............. G08G 1/167 |
| EP | 4571588 | A1 | * | 6/2025 | ........ G01C 21/3407 |
| JP | 7846827 | B2 | * | 4/2026 | |
| WO | WO-2025147357 | A1 | * | 7/2025 | ...... B60W 60/00274 |

OTHER PUBLICATIONS

Messaoud, et al., "Attention Based Vehicle Trajectory Prediction," in IEEE Transactions on Intelligent Vehicles, vol. 6, No. 1, pp. 175-185, Mar. 2021, doi: 10.1109/TIV.2020.2991952 (https://ieeexplore.ieee.org/document/9084255) (Year: 2021).*

International Search Report and Written Opinion—PCT/US2024/059134—ISA/EPO—Feb. 10, 2025.

* cited by examiner

800 o Lane waypoints
• Lane classification
☐ Ego history
◯ Target history
◯ Target prediction

LANE CHANGE PREDICTION ON HIGHWAYS

CROSS-REFERENCE TO RELATED APPLICATIONS

The present Application for Patent claims the benefit of U.S. Provisional Application No. 63/617,980, entitled "LANE CHANGE PREDICTION ON HIGHWAYS," filed Jan. 5, 2024, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Modern motor vehicles are increasingly incorporating semi-autonomous or autonomous driving features, such as technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of drive trajectory prediction performed by an ego vehicle includes applying a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and performing a driving maneuver based on the predicted lane change intention.

In an aspect, an ego vehicle includes one or more memories; one or more transceivers; and one or more processors communicatively coupled to the one or more memories and the one or more transceivers, the one or more processors, either alone or in combination, configured to: apply a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and perform a driving maneuver based on the predicted lane change intention.

In an aspect, an ego vehicle includes means for applying a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and means for performing a driving maneuver based on the predicted lane change intention.

In an aspect, a non-transitory computer-readable medium stores computer-executable instructions that, when executed by an ego vehicle, cause the ego vehicle to: apply a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and perform a driving maneuver based on the predicted lane change intention.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
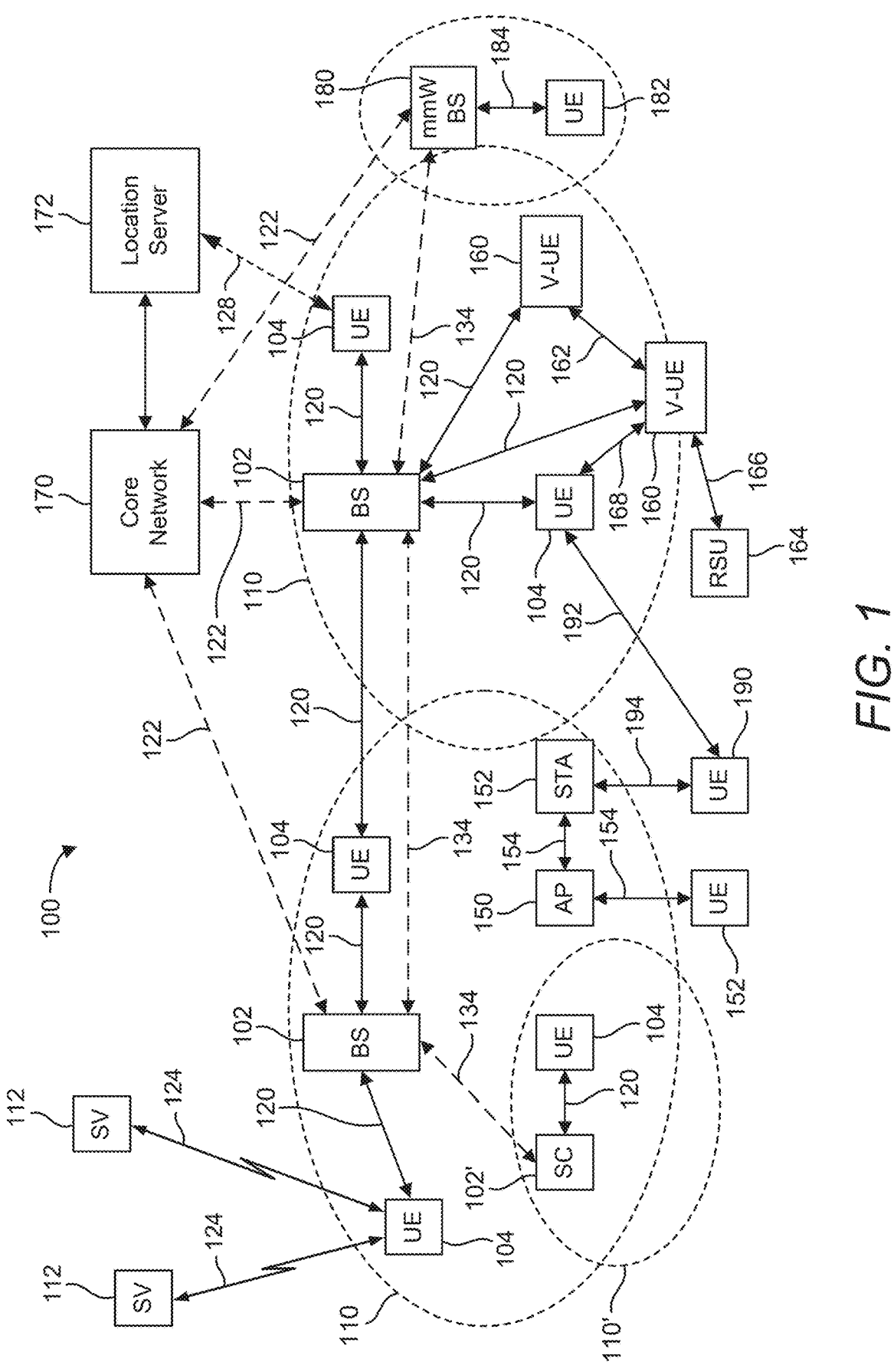
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to autonomous driving. Some aspects more specifically relate to drive trajectory predictions. In some examples, an ego vehicle applies a machine learning model to one or more agent tensors and one or more map tensors associated with a target vehicle to obtain a lane change classification label representing a predicted lane change intention of the target vehicle on a multi-lane highway, and performs a driving maneuver based on the predicted lane change intention. In some cases, the predicted lane change intention may include a lane change classification and optionally one or more predicted lane change trajectories associated with the lane change classification.

Particular aspects of the subject matter described in this disclosure can be implemented to realize one or more of the following potential advantages. In some examples, by applying a machine learning model to the one or more agent tensors and the one or more map tensors associated with the target vehicle to obtain the lane change classification label, the described techniques can be used to improve trajectory prediction of target agents/vehicles, and thereby, improve autonomous driving performance.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHz, FRI is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHZ. Other bands may be allocated in other countries. Thus, as a particular example, the medium of interest utilized by sidelinks 162, 166, 168 may correspond to at least a portion of the licensed ITS frequency band of sub-6 GHZ. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHZ (5.85-5.925 GHZ) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHZ.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
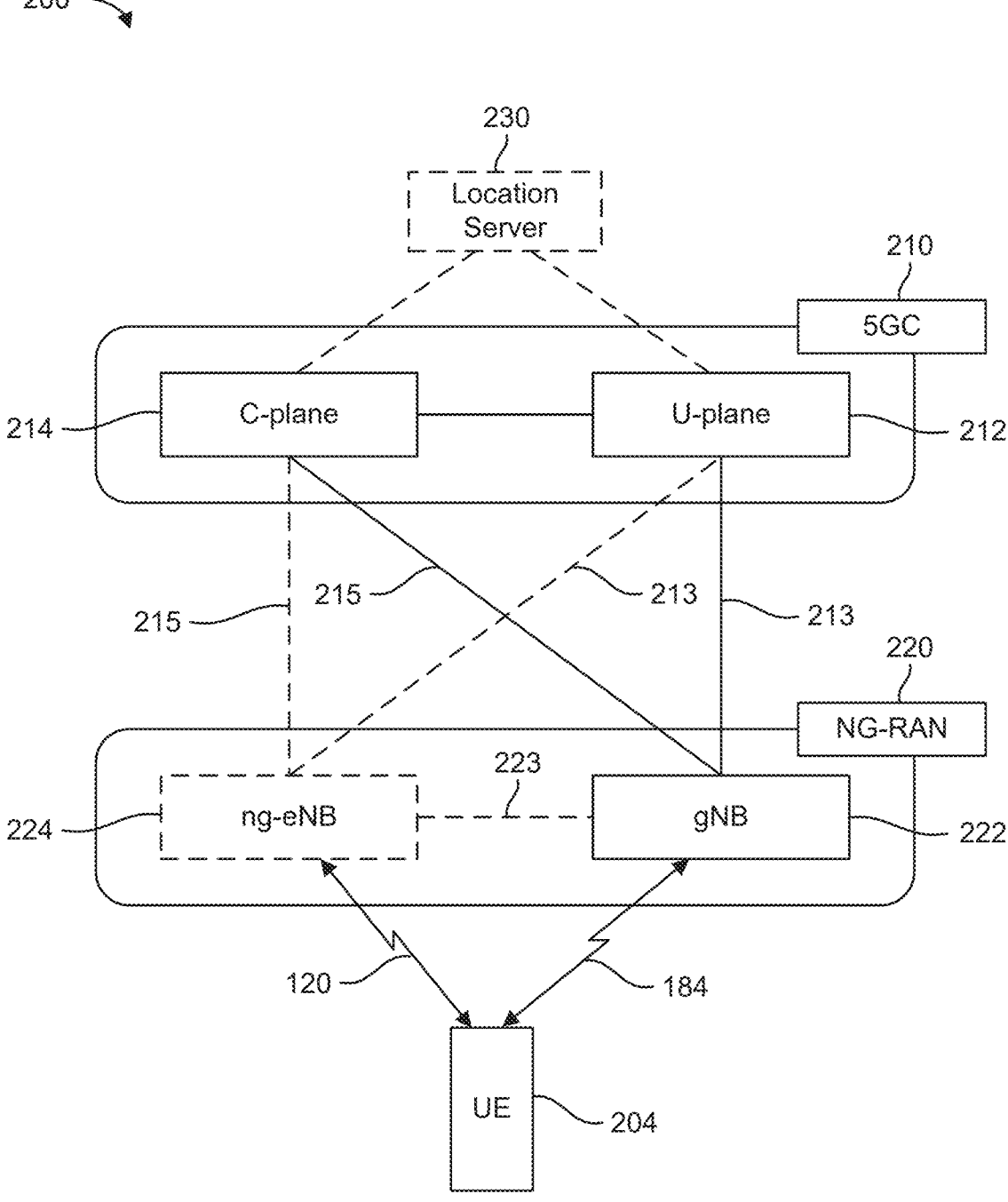
FIGS. 2A and 2B illustrate example wireless network structures, according to one or more aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
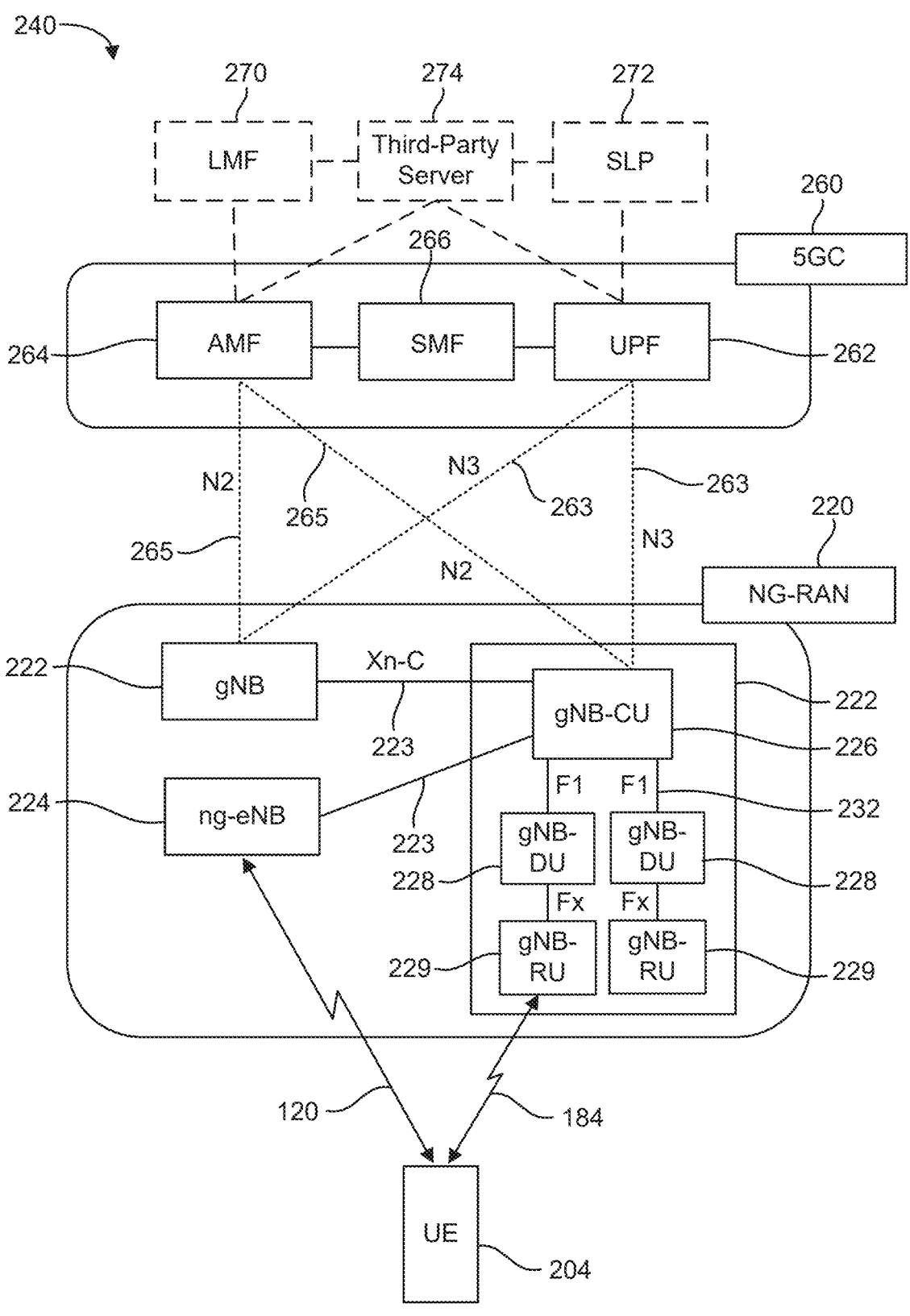

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Note that an autonomous or semi-autonomous vehicle may be, but need not be, a V-UE. Likewise, a V-UE may be, but need not be, an autonomous or semi-autonomous vehicle. An autonomous or semi-autonomous vehicle is a vehicle outfitted with an ADAS or ADS. A V-UE is a vehicle with cellular connectivity to a 5G or other cellular network. An autonomous or semi-autonomous vehicle that uses, or is capable of using, cellular techniques for positioning and/or navigation is a V-UE.

Figure 3A:
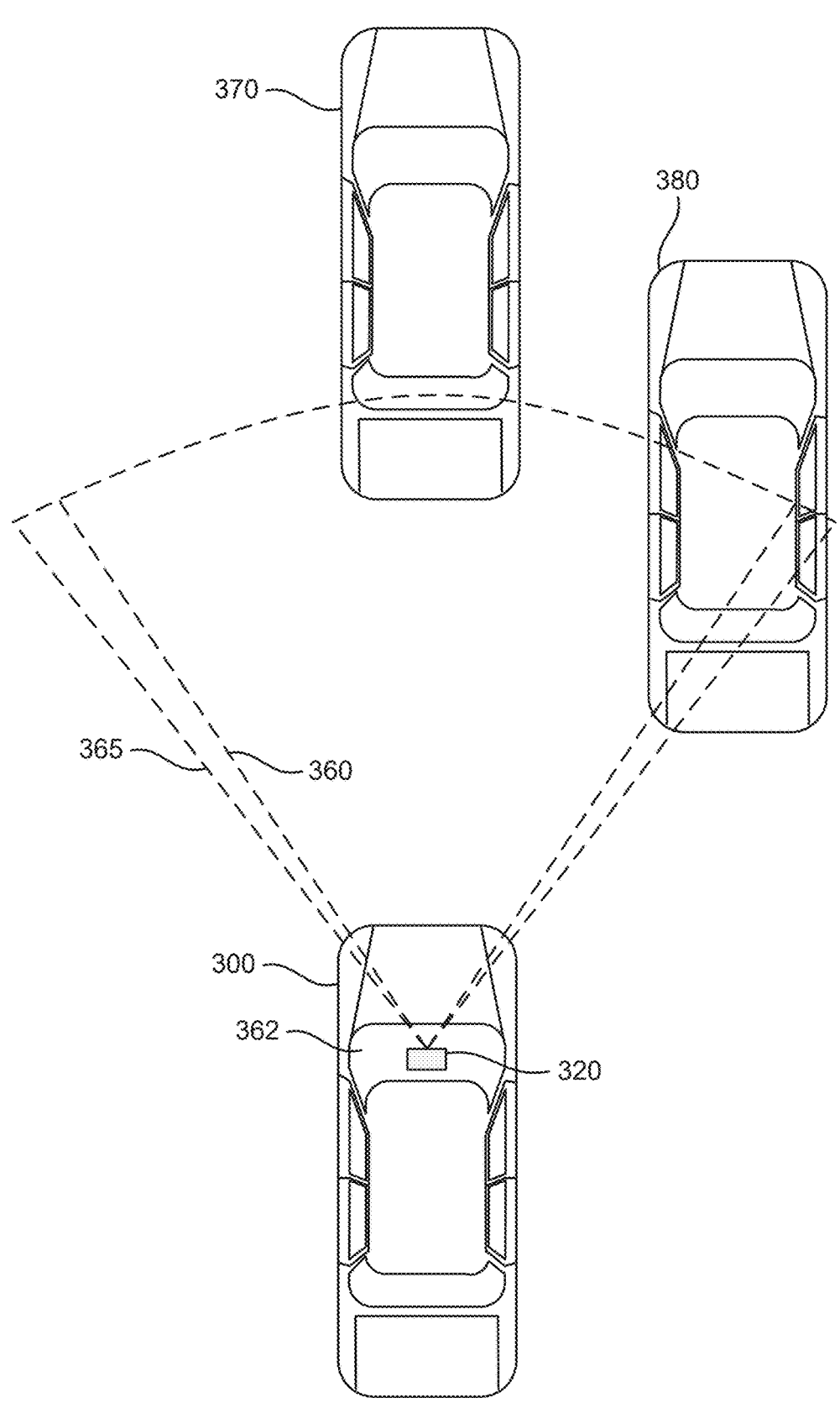
FIG. 3A is a top view of a vehicle employing an integrated radar-camera sensor behind the windshield, according to one or more aspects of the disclosure.

Referring now to FIG. 3A, a V2X-capable vehicle 300 (referred to as an "ego vehicle" or a "host vehicle") is illustrated that includes a radar-camera sensor module 320 located in the interior compartment of the V2X-capable vehicle 300 behind the windshield 362. The radar-camera sensor module 320 includes a radar component configured to transmit radar signals through the windshield 362 in a horizontal coverage zone 365 (shown by dashed lines), and receive reflected radar signals that are reflected off of any objects within the horizontal coverage zone 365. The radar-camera sensor module 320 further includes a camera component for capturing images based on light waves that are seen and captured through the windshield 362 in a horizontal coverage zone 360 (shown by dashed lines).

Although FIG. 3A illustrates an example in which the radar component and the camera component are co-located components in a shared housing, as will be appreciated, they may be separately housed in different locations within the V2X-capable vehicle 300. For example, the camera may be located as shown in FIG. 3A, and the radar component may be located in the grill or front bumper of the V2X-capable vehicle 300. Additionally, although FIG. 3A illustrates the radar-camera sensor module 320 located behind the windshield 362, it may instead be located in a rooftop sensor array, or elsewhere. Further, although FIG. 3A illustrates only a single radar-camera sensor module 320, as will be appreciated, the V2X-capable vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 362, door panels, bumpers, grills, etc.) or within a rooftop sensor array.

The radar-camera sensor module 320 may detect one or more (or none) objects relative to the V2X-capable vehicle 300. In the example of FIG. 3A, there are two objects, vehicles 370 and 380, within the horizontal coverage zones 360 and 365 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the V2X-capable vehicle 300 for automotive safety applications, such as adaptive cruise control (ACC), FCW, collision mitigation or avoidance via autonomous braking, LDW, and the like.

Co-locating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, co-location of the radar and camera is not required to practice the techniques described herein.

Figure 3B:
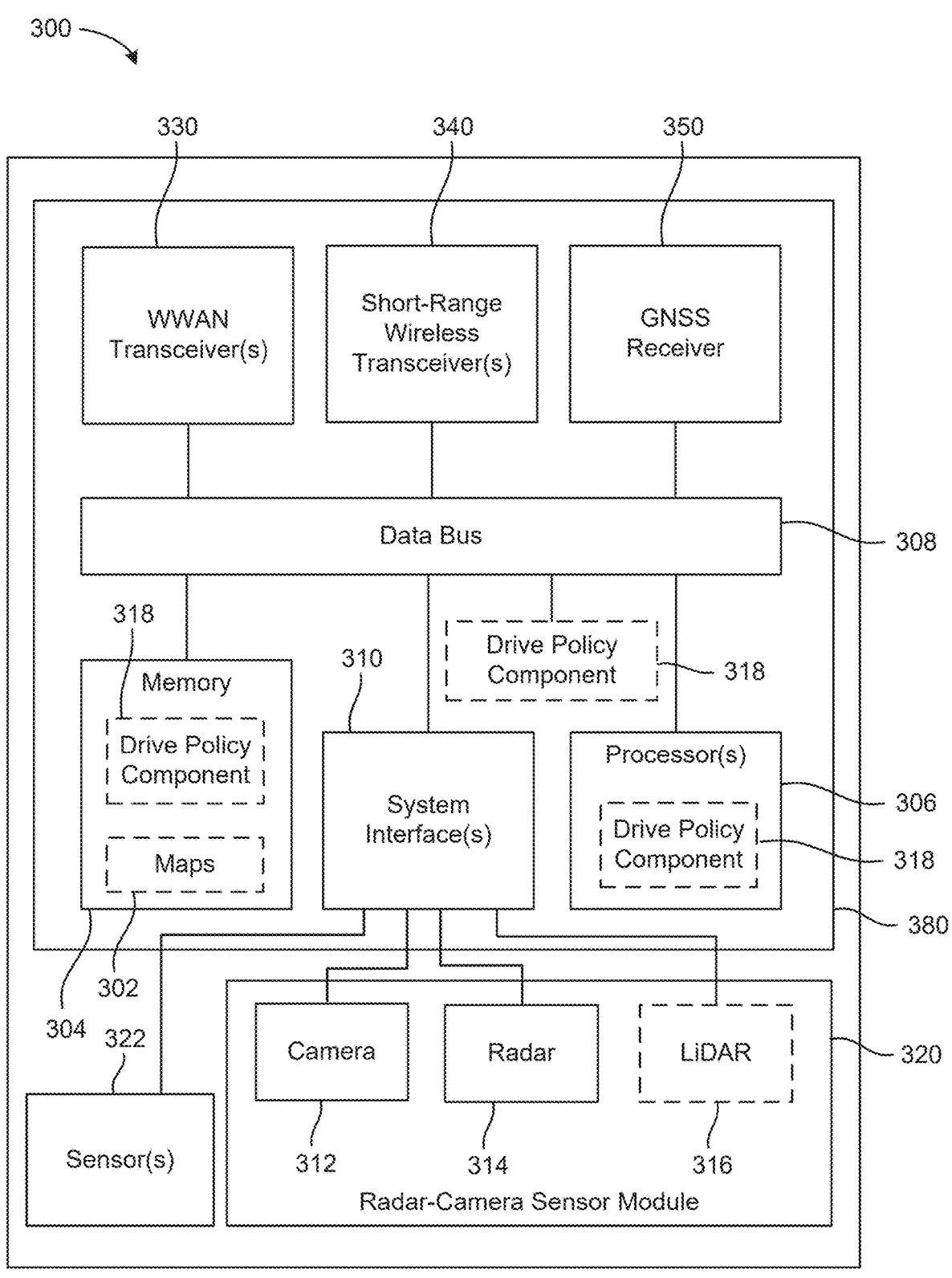
FIG. 3B illustrates an example on-board computer (OBC) architecture, according to one or more aspects of the disclosure.

FIG. 3B illustrates an on-board computer (OBC) 380 of a V2X-capable vehicle 300, according to various aspects of the disclosure. In an aspect, the OBC 380 may be part of an ADAS or ADS. The OBC 380 may also be the V-UE of the V2X-capable vehicle 300. The OBC 380 includes a non-transitory computer-readable storage medium, i.e., memory 304, and one or more processors 306 in communication with the memory 304 via a data bus 308. The memory 304 includes one or more storage modules storing computer-readable instructions executable by the one or more processors 306 to perform the functions of the OBC 380 described herein. For example, the one or more processors 306 in conjunction with the memory 304 may implement the various operations described herein.

One or more radar-camera sensor modules 320 are coupled to the OBC 380 (only one is shown in FIG. 3B for simplicity). In some aspects, the radar-camera sensor module 320 includes at least one camera 312, at least one radar 314, and at least one optional light detection and ranging (lidar) sensor 316. The OBC 380 also includes one or more system interfaces 310 connecting the one or more processors 306, by way of the data bus 308, to the radar-camera sensor module 320 and, optionally, other vehicle sub-systems (not shown).

The OBC 380 also includes, at least in some cases, one or more wireless wide area network (WWAN) transceivers 330 configured to communicate via one or more wireless communication networks (not shown), such as an NR network, an LTE network, a Global System for Mobile communication (GSM) network, and/or the like. The one or more WWAN transceivers 330 may be connected to one or more antennas (not shown) for communicating with other network nodes, such as other V-UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 330 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 380 also includes, at least in some cases, one or more short-range wireless transceivers 340 (e.g., a Wi-Fi transceiver, a BLUETOOTH® transceiver, etc.). The one or more short-range wireless transceivers 340 may be connected to one or more antennas (not shown) for communicating with other network nodes, such as other V-UEs, pedestrian UEs, infrastructure access points, RSUs, etc., via at least one designated RAT (e.g., cV2X), IEEE 802.11p (also known as wireless access for vehicular environments (WAVE)), dedicated short-range communication (DSRC), etc.) over a wireless communication medium of interest. The one or more short-range wireless transceivers 340 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 380 also includes, at least in some cases, a global navigation satellite system (GNSS) receiver 350. The GNSS receiver 350 may be connected to one or more antennas (not shown) for receiving satellite signals. The GNSS receiver 350 may comprise any suitable hardware and/or software for receiving and processing GNSS signals. The GNSS receiver 350 requests information and operations as appropriate from the other systems, and performs the calculations necessary to determine the vehicle's 300 position using measurements obtained by any suitable GNSS algorithm.

In an aspect, the OBC 380 may utilize the one or more WWAN transceivers 330 and/or the one or more short-range wireless transceivers 340 to download one or more maps 302 that can then be stored in memory 304 and used for vehicle navigation. Map(s) 302 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by the V2X-capable vehicle 300. Map(s) 302 may also provide electronic horizon predictive awareness, which enables the V2X-capable vehicle 300 to know what lies ahead.

The V2X-capable vehicle 300 may include one or more sensors 322 that may be coupled to the one or more processors 306 via the one or more system interfaces 310. The one or more sensors 322 may provide means for sensing or detecting information related to the state and/or environment of the V2X-capable vehicle 300, such as speed, heading (e.g., compass heading), headlight status, gas mileage, etc. By way of example, the one or more sensors 322 may include an odometer a speedometer, a tachometer, an accelerometer (e.g., a micro-electromechanical system-s (MEMS) device), a gyroscope, a geomagnetic sensor (e.g., a compass), an altimeter (e.g., a barometric pressure altimeter), etc. Although shown as located outside the OBC 380, some of these sensors 322 may be located on the OBC 380 and some may be located elsewhere in the V2X-capable vehicle 300.

The OBC 380 may further include a drive policy component 318. The drive policy component 318 may be a hardware circuit that is part of or coupled to the one or more processors 306 that, when executed, causes the OBC 380 to perform the functionality described herein. In other aspects, the drive policy component 318 may be external to the one or more processors 306 (e.g., part of a positioning processing system, integrated with another processing system, etc.). Alternatively, the drive policy component 318 may be one or more memory modules stored in the memory 304 that, when executed by the one or more processors 306 (or positioning processing system, another processing system, etc.), cause the OBC 380 to perform the functionality described herein. As a specific example, the drive policy component 318 may comprise a plurality of positioning engines, a positioning engine aggregator, a sensor fusion module, and/or the like. FIG. 3B illustrates possible locations of the drive policy component 318, which may be, for example, part of the memory 304, the one or more processors 306, or any combination thereof, or may be a standalone component.

In an aspect, the camera 312 may capture image frames (also referred to herein as camera frames) of the scene within the viewing area of the camera 312 (as illustrated in FIG. 3A as horizontal coverage zone 360) at some periodic rate. Likewise, the radar 314 may capture radar frames of the scene within the viewing area of the radar 314 (as illustrated in FIG. 3A as horizontal coverage zone 365) at some periodic rate. The periodic rates at which the camera 312 and the radar 314 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

For convenience, the OBC 380 is shown in FIG. 3B as including various components that may be configured according to the various examples described herein. It will be appreciated, however, that the illustrated components may have different functionality in different designs. In particular, various components in FIG. 3B are optional in alternative configurations and the various aspects include configurations that may vary due to design choice, costs, use of the device, or other considerations. For brevity, illustration of the various alternative configurations is not provided herein, but would be readily understandable to one skilled in the art.

The components of FIG. 3B may be implemented in various ways. In some implementations, the components of FIG. 3B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 302 to 350 may be implemented by processor and memory component(s) of the OBC 380 (e.g., by execution of appropriate code and/or by appropriate configuration of processor components). For simplicity, various operations, acts, and/or functions are described herein as being performed "by a UE," "by an OBC," or "by a vehicle." However, as will be appreciated, such operations, acts, and/or functions may actually be performed by specific components or combinations of components of the OBC 380, such as the one or more processors 306, the one or more transceivers 330 and 340, the memory 304, the drive policy component 318, etc.

In an autonomous or semi-autonomous driving scenario, the ego vehicle needs to make various driving decisions, such when to change lanes (e.g., to avoid obstacles, move to an exit lane, etc.), where to merge into traffic, whether to pass another vehicle, and the like. These types of decisions are referred to as "driving policy" or "drive policy" and may be executed by the OBC 380 (e.g., the one or more processors 306, drive policy component 318, memory 304, etc.) based on information from the radar-camera sensor module 320 and/or sensor(s) 322.

Driving policy involves trajectory prediction and route planning functionality. Trajectory prediction follows a data-driven approach that incorporates blinker state information, and trajectory history of other vehicles (referred to as "agents") around the ego vehicle, along with map geometry (e.g., from maps 302). A graph-based neural network learns multi-agent interactions, while a weighted, multi-modal distribution of trajectories represents the uncertainty in agent intentions and motion. Stochastic predicted trajectories are used in tree search and dynamic programming optimizers for risk-minimizing ego maneuvers. Note that a tree search is only one method, but trajectory prediction could also be performed using a graph-based neural network, where the weightings of the neural network can be updated to adjust which trajectories/paths are still viable.

Route planning attempts to understand the probabilistic evolution of the world through the exploration of belief space. Ego actions are defined through the generation of possible trajectories and agent actions through prediction input. Route planning efficiently prunes the search space (e.g., a search tree) and evaluates candidate trajectories for risk and reward. The output is the coarse reference trajectory along with a corresponding belief of the world and relevant semantics.

Note that a driving trajectory is not necessarily a single driving maneuver (e.g., a lane change, braking, merging, etc.), but rather, is a driving path that may be taken that may be several seconds to minutes into the future. A driving trajectory may therefore include one or more planned driving maneuvers over a time period of several seconds to several minutes into the future.

Figure 4:
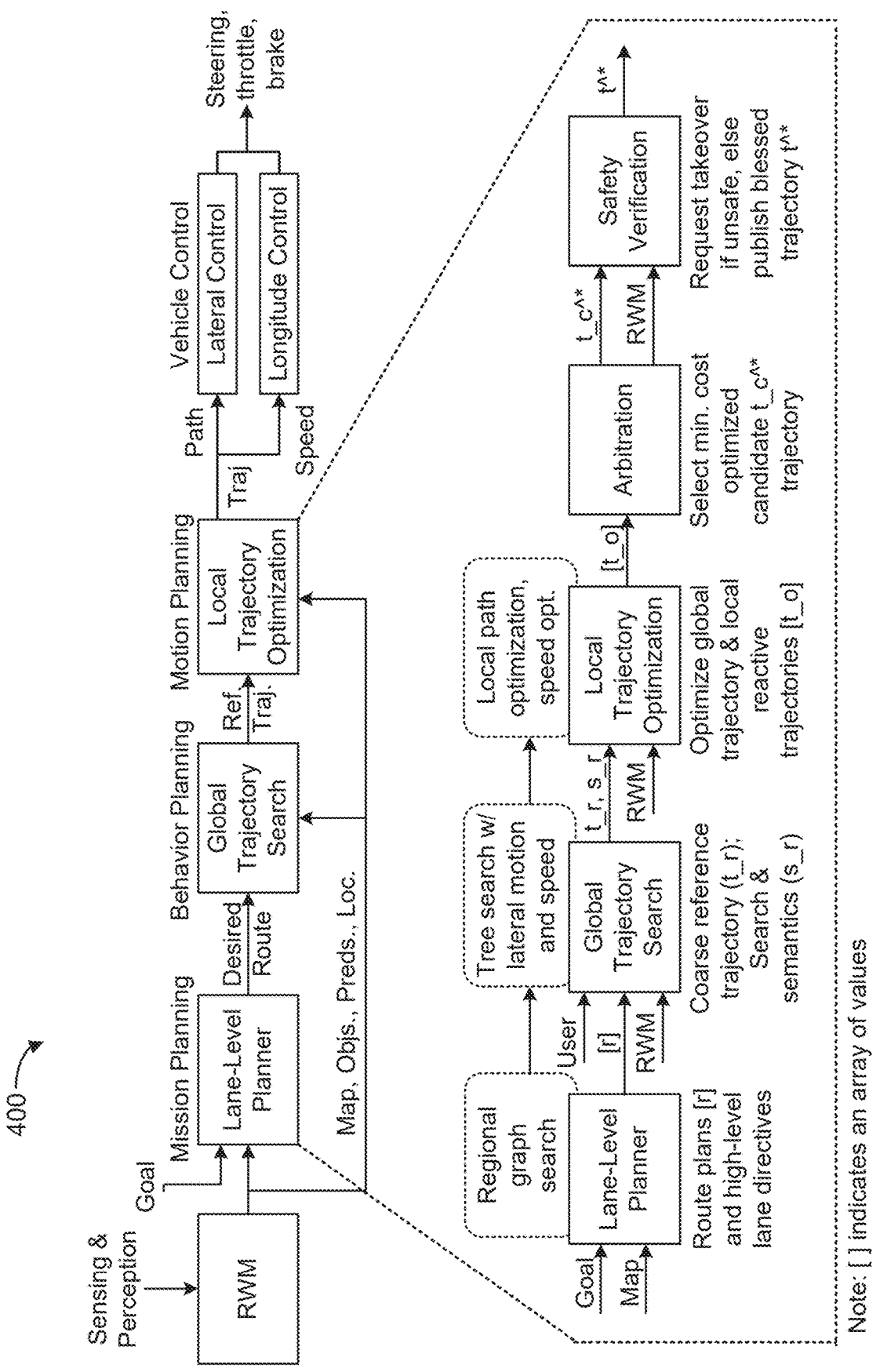
FIG. 4 is a diagram illustrating an example driving policy pipeline, according to one or more aspects of the disclosure.

FIG. 4 is a diagram 400 illustrating an example driving policy pipeline, according to aspects of the disclosure. As shown in FIG. 4, at a high level, sensing and perception information (e.g., from camera(s) 312, radar(s) 314, lidar sensor(s) 316, sensor(s) 322) is fed into a real-world model (RWM) block, which outputs map data (e.g., from map(s) 302), object detection results (e.g., of both fixed and moving objects), trajectory predictions of detected moving objects, and the location of the vehicle to a lane-level planner block, a global trajectory search block, and a local trajectory optimization block.

The lane-level planner block takes at least the map data from the RWM block, as well as the driving goal (e.g., change lanes, merge, pass, etc.), and outputs the desired route plan [r] and high-level lane directives to the global trajectory search block. The global trajectory search block generates a set of coarse reference trajectories (denoted t_r) and a set of search and semantics parameters s_r based on the desired route plan [r] and the information from the RWM block. The global trajectory search block outputs t_r and s_r to the local trajectory optimization block, which, based on the information from the RWM block, optimizes the set of coarse reference trajectories t_r and local reactive trajectories to determine a set of optimized trajectories [t_o].

An arbitration block (e.g., within the local trajectory optimization block) selects the minimum cost candidate trajectory $t\_c^*$ from the set of optimized trajectories [t_o] received from the local trajectory optimization block. The arbitration block outputs the minimum cost candidate trajectory $t\_c^*$ to a safety verification block (e.g., within the local trajectory optimization block), which verifies the safety of the minimum cost candidate trajectory $t\_c^*$ and, if safe, outputs the candidate trajectory $t\_c^*$ as a final "blessed" trajectory $t^*$ to a lateral control block and a speed for the trajectory $t^*$ to a longitude control block. Based on these inputs, the lateral control block and the longitude control block output steering, throttle, and brake control signals to the respective vehicle systems.

Machine learning may be used to generate models that may be used to facilitate various aspects associated with processing of data. One specific application of machine learning relates to generation of models for drive trajectory prediction, such as stopping, turning, changing lanes, and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 5:
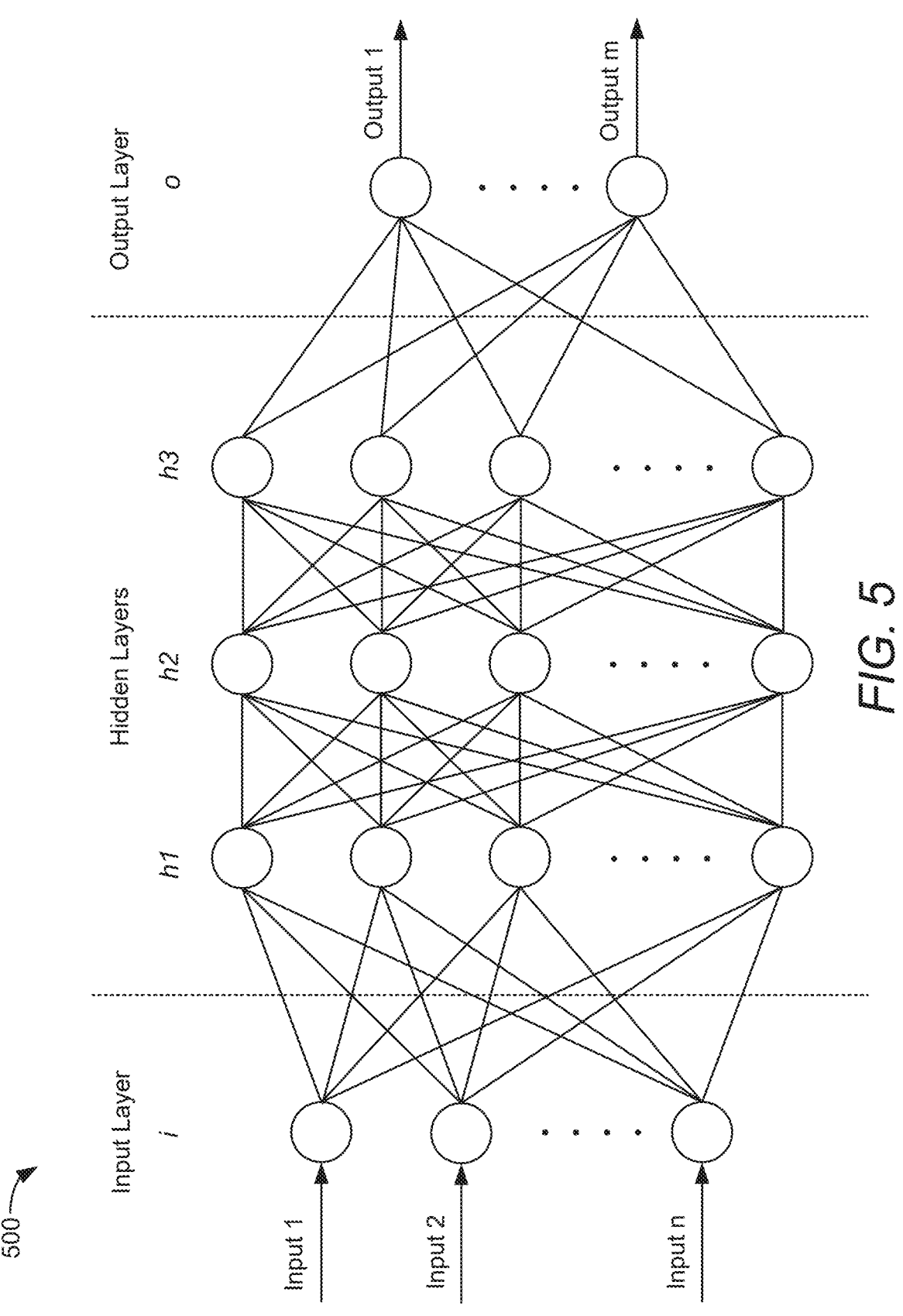
FIG. 5 illustrates an example neural network, according to aspects of the disclosure.

FIG. 5 illustrates an example neural network 500, according to aspects of the disclosure. The neural network 500 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., the presence of other vehicles, detections of road boundaries, etc.) and to associate this training input data with an output data set (e.g., a set of possible or likely candidate trajectories of the other vehicle(s) and/or the ego vehicle), thereby enabling later determination of the same output data set when presented with similar input data (e.g., from other target UEs at the same or similar location).

The ability to predict lane changes as early as possible while having a low false positive rate (i.e., predicting a lane change that is then not performed) and a low false negative rate (i.e. not predicting a lane change that is actually performed) is very important for autonomous driving, especially at high speeds on highways. The goal is to predict whether other vehicles around the ego vehicle are going to continue to stay in their lanes or change lanes either to their left or right within some time period in the future (e.g., within the next two seconds). This information is used to generate candidate future trajectories for vehicles around the ego vehicle and is used by the planning module(s) (see, e.g., FIG. 4) to evaluate the ego vehicle's candidate future trajectories and choose collision-free and comfortable trajectories to be executed by the ego vehicle.

Of special importance is to predict whether a vehicle driving in a lane adjacent to the ego vehicle is trying to cut into the ego vehicle's lane (also referred to as the "ego lane") just ahead of the ego vehicle. Also, at merges in highways and on-ramps, it is important to predict the trajectories of the vehicles merging into the ego lane. An additional factor is that tasks such as scene encoding, model inference, and trajectory generation need to be performed in real-time within the allocated budget of, for example, 30 ms, and thus, any prediction model needs to be extremely efficient.

Predicting lane change trajectories at highway speeds with high fidelity and efficiency can be formulated as a deep learning classification problem. Time series data of the trajectories of vehicles around the ego vehicle (referred to as "agents") are collected, processed, and associated to lanes. Auto-labeling is used to detect lane change events and label two seconds (for example) leading up to a lane change (i.e., when the vehicle crosses the map lane boundary) as either a left lane change or a right lane change depending on the direction. All other timesteps are labeled as "lane keep". This helps to generate the ground truth labels for the classification task that the deep learning model is to learn to predict.

For inputs to the machine learning model, the agent context is represented by providing the target agent's (also referred to as a "target vehicle" or "agent of interest" or "interest agent," and which is the agent currently being considered or processed by the prediction model) history along with its neighboring agents' history up to the currently considered timestamp using various features (e.g., position, previous position, lateral and longitudinal velocity, angular velocity, acceleration, blinker state, time offset to the current timestamp, and a presence of vehicle flag). For map information, the map context for the network is represented by representing the current, left, and right lanes to the target agent. For the highway lanes, map center points are accumulated for positions ahead and behind the target agent and a compact tensor is prepared to provide enough mapping context for the target agent to predict lane changes by the target agent while at the same time keeping the inference time as low/fast as possible.

The disclosed machine learning model may be implemented as an encoder-decoder architecture. For the agent encoding, a two-stage VectorNet-based network architecture may be used that first aggregates information along the temporal dimension using one or more PointNet-based layers and then uses a global self-attention layer that treats all agents as a fully connected network and uses the target agent features to attend over all agent features.

For the map, a 1×1 two-dimensional (2D) convolution, max-pool, and fully connected layers are used, followed by a long short term memory (LSTM) to encode temporal information along points in each lane. The model indexes into the LSTM hidden state based on the number of available points in the tensor and uses that as the final encoding. A final self-attention layer uses agent feature encoding as a query and map features as the keys and values, allowing agent features to be used to attend over map features. The attended map output is concatenated with the agent hidden features. This forms the output of the encoder that is fed to the decoder.

The decoder side uses a series of fully connected layers trained to predict the lane change classification (left lane change, lane keep, right lane change) probabilities. The model is thereby able to achieve low (e.g., 2 ms) inference time and high precision and recall scores for lane changes.

Figure 6:
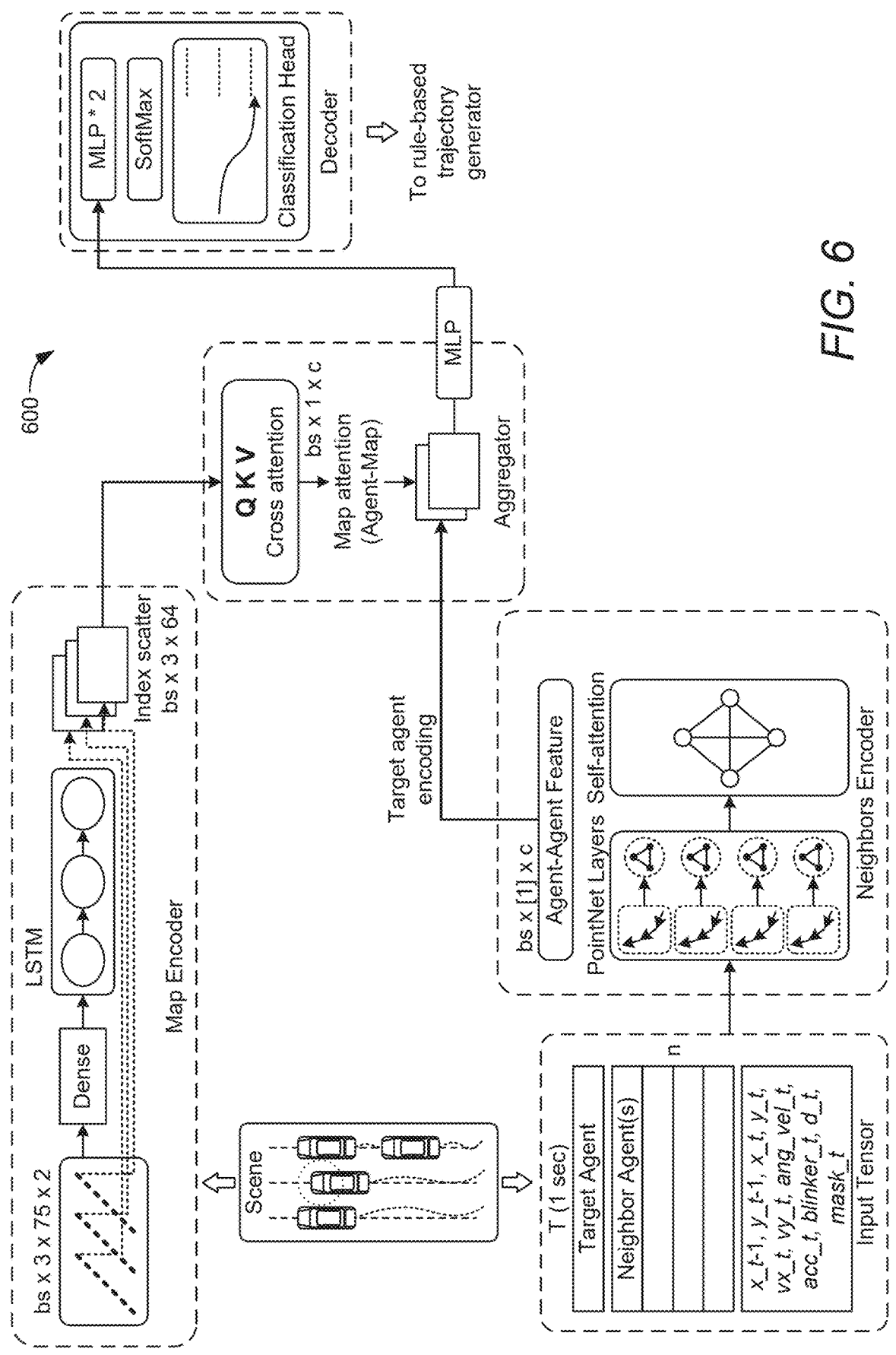
FIG. 6 is a diagram illustrating an example encoder-decoder machine learning model architecture for predicting lane change classification labels of an agent (vehicle) of interest, according to aspects of the disclosure.

FIG. 6 is a diagram 600 illustrating an example encoder-decoder machine learning model architecture for predicting lane change classification labels of an agent (vehicle) of interest, according to aspects of the disclosure. As shown in FIG. 6, an ego vehicle is travelling in the center lane of a three-lane highway, an agent is beside the ego vehicle in the left lane, and two agents are beside the ego vehicle in the right lane.

The illustrated model takes as input a T×n×F agent tensor, where T represents the number of agents observed in the last one second (for example), F represents the feature set ($x_{t-1}$, $y_{t-1}$, $x_t$, $y_t$, $vx_t$, $vy_t$, $ang\_vel_t$, $acc_t$, $blinker_t$ $d_t$, $mask_t$) per agent, and n represents the number of agents (the target agent and any neighbor agents). In each feature set F, $x_t$ and $y_t$ (also denoted x_t and y_t, respectively) represent the x-y position of the target agent at timestamp t, $x_{t-1}$, $y_{t-1}$ (also denoted x_t−1 and y_t−1, respectively) represent the previous x-y position of the target, $vx_t$ and $vy_t$ (also denoted vx_t and vy_t, respectively) represent the lateral and longitudinal velocity of the target agent, $ang\_vel_t$ (also denoted ang_vel_t) represents the angular velocity of the target agent, $acc_t$ (also denoted acc_t) represents the acceleration of the target agent, blinker (also denoted blinker_t) represents the blinker state (e.g., left turn indicator blinking, right turn indicator blinking, etc.) of the target agent, dr (also denoted d_t) represents the time offset to the current timestamp t, and $mask_t$ (also denoted mask_t) is a presence of vehicle flag.

The input agent tensor is fed to one or more PointNet-like layers of a neighbors encoding module (labeled "Neighbors Encoder"). A PointNet is a neural network that directly consumes point clouds and provides a unified architecture for applications such as object classification, part segmentation, and scene semantic parsing. A PointNet network learns a set of optimization functions/criteria that select interesting or informative points of the point cloud and encode the reason for their selection. The final fully connected layers of the network aggregate these learned optimal values into the global descriptor for the entire shape (shape classification) or are used to predict per point labels (shape segmentation).

The output of the PointNet-like layer(s) is passed to a self-attention model. Self-attention is a fundamental concept in natural language processing (NLP) and deep learning, especially prominent in transformer-based models. Self-attention enables models to weigh the importance of different parts of an input sequence when making predictions or capturing dependencies between words. Its role is to imbue contextual wisdom, allowing the model to discern the significance of individual elements within a sequence and dynamically adjust their influence on the final output. This orchestration is particularly significant where the meaning of an input element is based on the meaning of other input elements (e.g., as in language processing tasks).

In self-attention, the query (Q) is the element seeking information. For each element in the input sequence, a query vector is calculated. These queries represent the elements within the sequence that should receive attention. The key(s)

(K) help to identify and locate important elements in the sequence. Like queries, key vectors are computed for each element of interest. The value(s) (V) carry the information. Once again, for each element, a value vector is computed. These vectors hold the content that is to be considered when determining the importance of elements in the sequence.

For each element in the input sequence, the query, key, and value vectors are calculated. These vectors are the foundation upon which the attention mechanism operates. Attention scores are then computed for each pair of elements in the sequence. The attention score between a query and a key quantifies their compatibility or relevance. Finally, the attention scores are used as weights to perform a weighted aggregation of the value vectors. This aggregation results in the self-attention output, representing an enhanced and contextually informed representation of the input sequence.

A map encoding module (labeled "Map Encoder") encodes lane information corresponding to the scene around the ego vehicle. Here, this is represented by the tensor bs×3×75×2, where "bs" represents the batch size, "3" represents the number of lanes, "75" represents the number of points, and "2" represents the x and y coordinates of the point. These numbers are the shape (dimension) of the input map tensor. The map encoding module further includes an LSTM module to encode temporal information related to the map data. Finally, one or more index scatter layers generate an output tensor (here, represented as bs×3×64, where "bs" represents the batch size, "3" represents the number of lanes, and "64" represents the latent feature vector size that is learned).

The neighbors encoding module outputs an agent-agent feature (represented as bs×[1]×c, where "bs" represents the batch size, "[1]" represents a single output vector, and "c" represents the latent agent-agent feature vector size that is learned) and the results of the self-attention to an aggregation module (labeled "Aggregator"). Specifically, the agent-agent feature is provided to one or more aggregation layers and the results of the self-attention are provided to a cross-attention module. The map encoding module also outputs the final tensor to the cross-attention module, which generates an agent-map feature (represented as bs×1×c, where "bs" represents the batch size, "1" represents a single output vector, and "c" represents the latent agent-map feature vector size that is learned). Thus, the disclosed model attends over the agents and the map data separately and then both together (the cross attention).

The aggregation layer(s) of the aggregation module output their result(s) to a multi-layer perception (MLP) layer, which outputs to further MLP layers in the decoder side of the disclosed machine learning model. On the decoder side, MLP layers for each classification output predict the lane change classification labels of the agent of interest. The encoder-decoder machine learning model may be applied to multiple agents of interest (e.g., all vehicles close enough to the ego vehicle on the highway to impact the driving decisions of the ego vehicle) to obtain the predicted classification labels for each interest agent. For example, in one iteration of the model, the vehicle to the left of the ego vehicle may be processed as the agent of interest and the two vehicles to the right may be processed as neighboring agents, and in another iteration, the lead vehicle on the right of the ego vehicle may be processed as the agent of interest and the two remaining vehicles may be processed as neighboring agents. The predicted classification labels can then be used by a rule-based trajectory generator to generate candidate trajectories for the planning modules to consume (see, e.g., FIG. 4).

Figure 7:
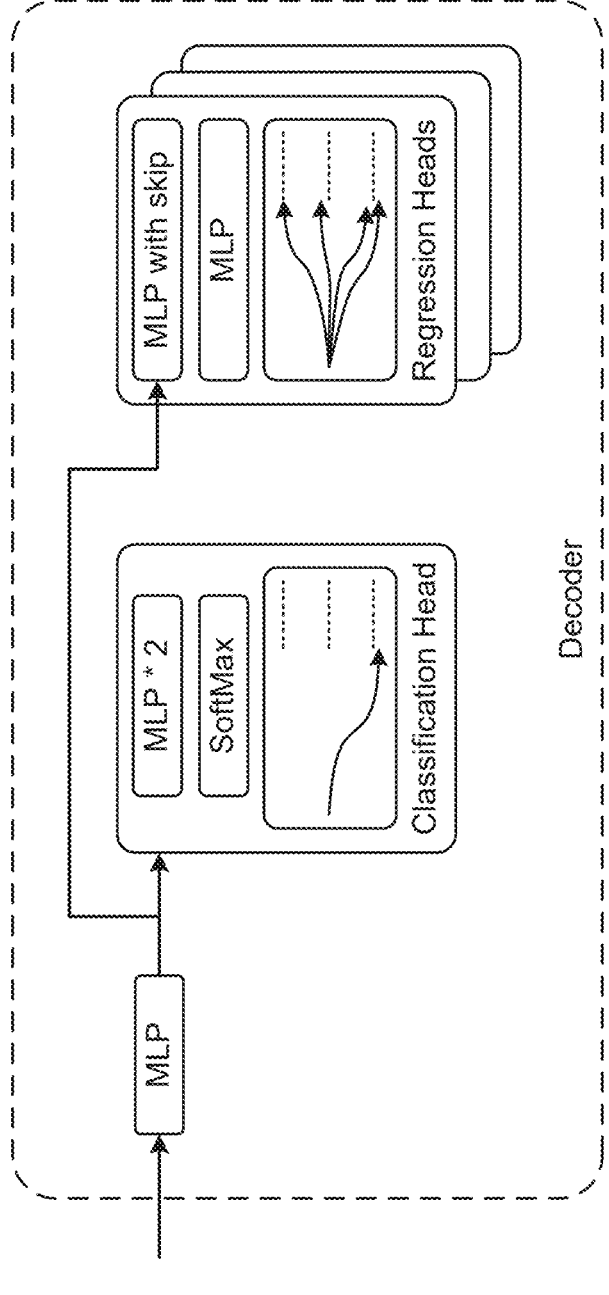
FIG. 7 is a diagram illustrating an example enhancement to the example encoder-decoder machine learning model architecture illustrated in FIG. 6, according to aspects of the disclosure.

FIG. 7 is a diagram 700 illustrating an example enhancement to the example encoder-decoder machine learning model architecture illustrated in FIG. 6, according to aspects of the disclosure. As shown in FIG. 7, on the decoder side of the disclosed encoder-decoder machine learning model architecture, in addition to the classification head illustrated in FIG. 6, three regression heads have been added. Each regression head corresponds to one of the three possible lane change classifications (i.e., left lane change, right lane change, straight) and outputs what the trajectory of the respective lane change might look like based on the inputs, as well as the probability of that lane change being performed. The predicted trajectory may be output as a series of x-y coordinates. In some cases, the trajectories may be predicted up to three seconds out.

Thus, while the decoder side of the encoder-decoder machine learning model architecture illustrated in FIG. 6 simply output the probabilities of the respective lane change classifications, the output of the decoder side illustrated in FIG. 7 also includes the predicted trajectories of the lane change classifications. That is, the encoder-decoder machine learning model in FIG. 6 may output the intention of the agent of interest, which is consumed by a downstream rule-based trajectory generator to generate trajectories. In contrast, the decoder in FIG. 7 also outputs the trajectories associated with the predicted lane change intentions. Having separate regression heads helps train a specialized trajectory generator for each lane change intention (i.e., left lane change, right lane change, straight). This provides more realistic trajectories compared to the rule-based method, and is better able to model complex scenarios like stop-and-go, cut-ins, merges, splits, and interactions with other agents. The decoder side illustrated in FIG. 7 is also better able to deal with input noise from object fusion.

Figure 8:
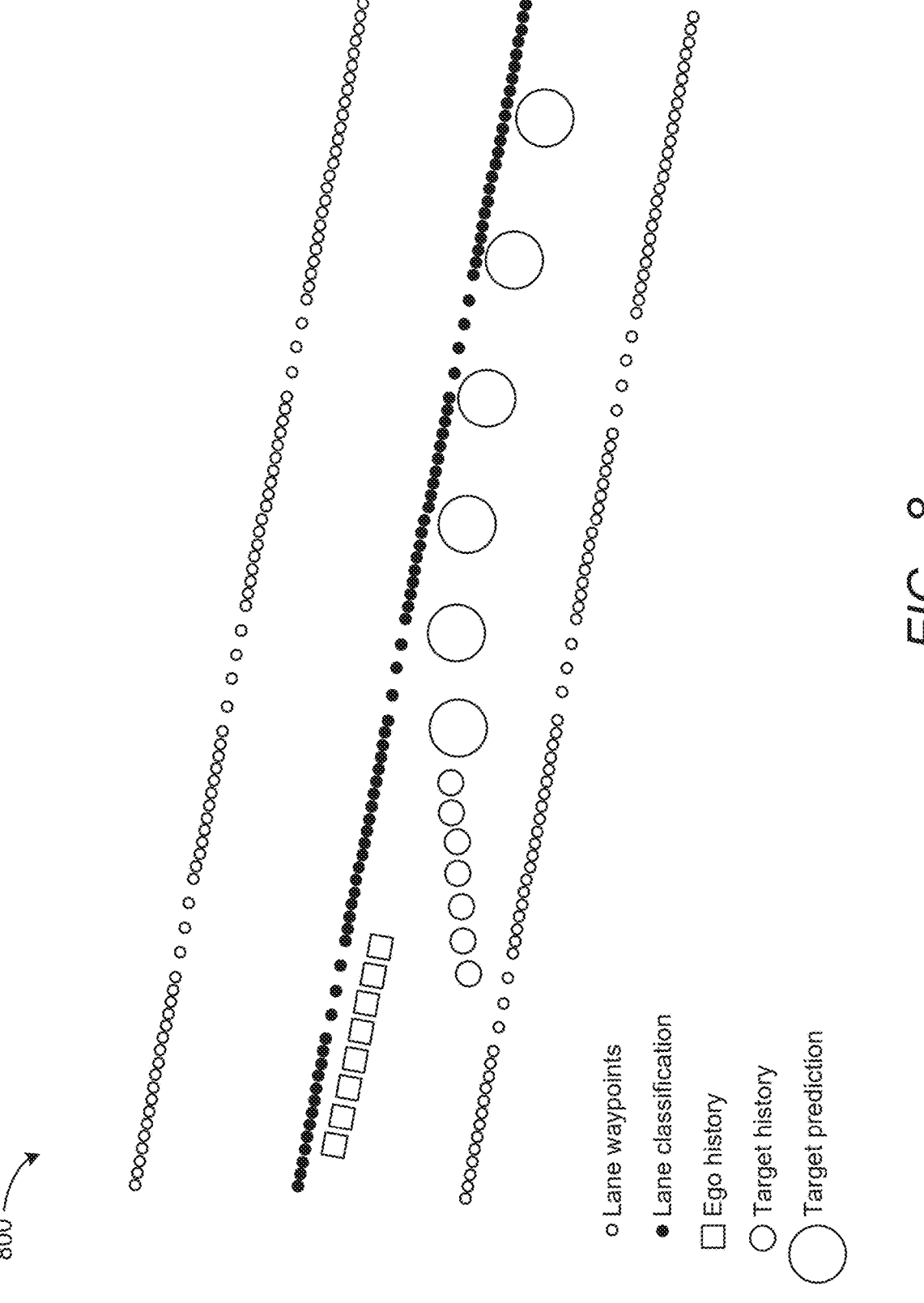
FIGS. 8 and 9 are diagrams illustrating example highway scenarios, according to aspects of the disclosure.

FIG. 8 is a diagram 800 illustrating an example highway scenario, according to aspects of the disclosure. In diagram 800, an ego vehicle (the trajectory of which is represented by a series of squares) is driving to the left of an agent of interest (the current trajectory of which is represented by a series of small dark circles). Based on applying the encoder-decoder machine learning model illustrated in FIG. 6 to observations about the agent of interest (e.g., determined, at least in part, from sensor information, such as from camera(s) 312, radar(s) 314, and/or lidar sensor(s) 316) and map information (e.g., from map(s) 302), the most likely trajectory of the agent of interest is determined. Specially, a series of future predicted trajectory points is determined (represented by a series of larger circles) for the most likely trajectory of the target agent. As shown, the target agent is predicted to switch lanes to the left, resulting in the target agent traveling in front of the ego vehicle in the same lane.

Figure 9:
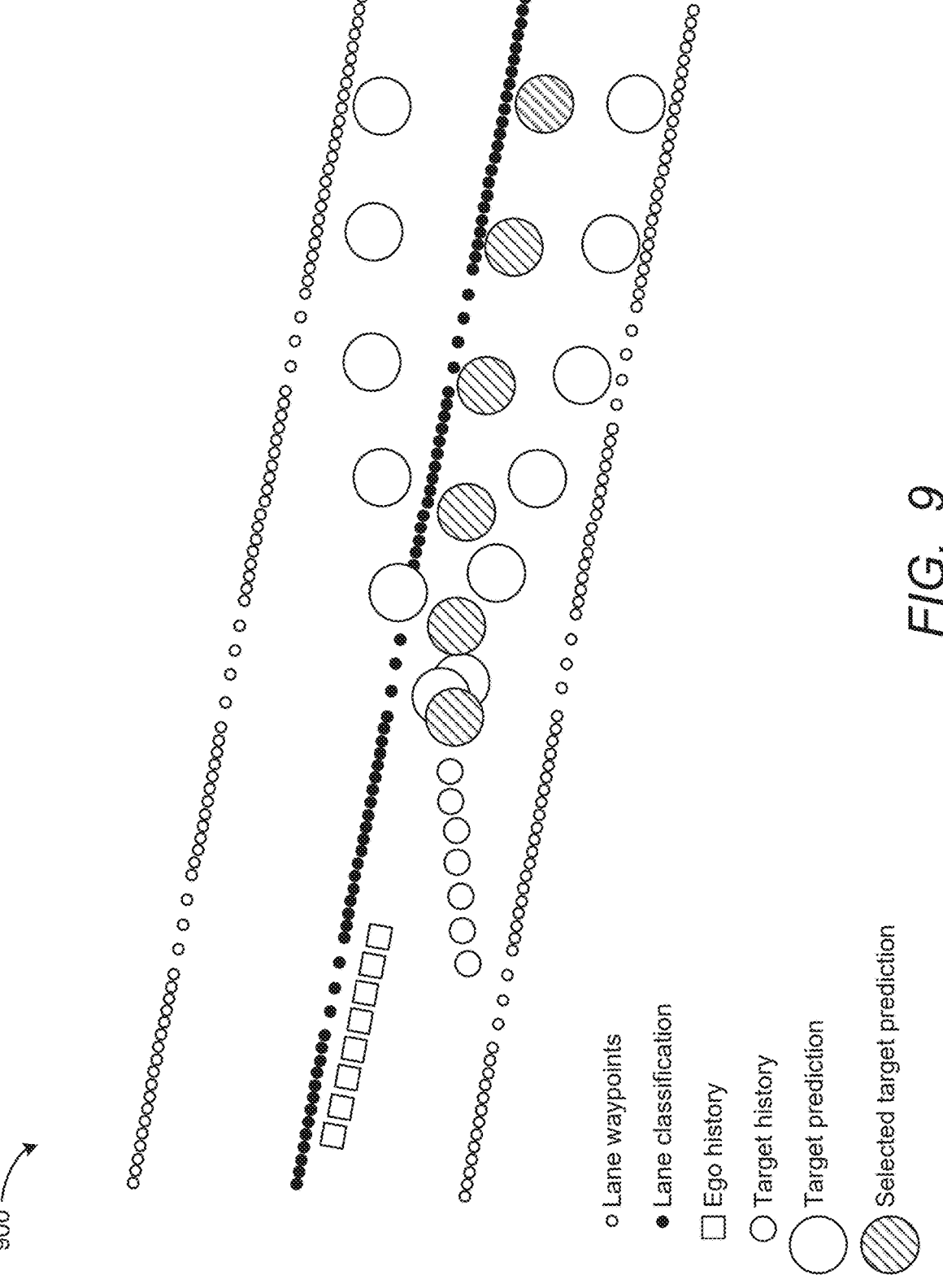

FIG. 9 is a diagram 900 illustrating an example highway scenario, according to aspects of the disclosure. In diagram 900, an ego vehicle (the trajectory of which is represented by a series of squares) is driving to the left of an agent of interest (the current trajectory of which is represented by a series of small dark circles). Based on applying the encoder-decoder machine learning model illustrated in FIGS. 6 and 7 to observations about the agent of interest (e.g., determined, at least in part, from sensor information, such as from camera(s) 312, radar(s) 314, and/or lidar sensor(s) 316) and map information (e.g., from map(s) 302), multiple predicted trajectories of the agent of interest are determined. Specifically, a series of future predicted trajectory points is determined (represented by a series of larger circles) for each of the predicted intentions of the target agent. One of the predicted trajectories (e.g., the most likely/highest probability) may then be selected. As shown in the example of FIG. 9, the target agent is predicted to switch lanes to the left, resulting in the target agent traveling in front of the ego vehicle in the same lane.

Note that while FIG. 9 illustrates the encoder-decoder machine learning model illustrated in FIGS. 6 and 7 determining multiple predicted trajectories of the agent of interest, the encoder-decoder machine learning model illustrated in FIGS. 6 and 7 may predict zero or more trajectories for a predicted lane change intention (i.e., left, right, straight), with the associated probabilities. That is, one predicted lane change intention (i.e., left, right, or straight) may be associated with zero or more predicted trajectories. For example, if a particular lane change intention is blocked (e.g., the target agent cannot make a left lane change), there will be zero predicted trajectories for that lane change intention. Thus, in some cases, the output of the encoder-decoder machine learning model illustrated in FIGS. 6 and 7 may be a single predicted trajectory, and in other cases, may be multiple predicted trajectories.

Figure 10:
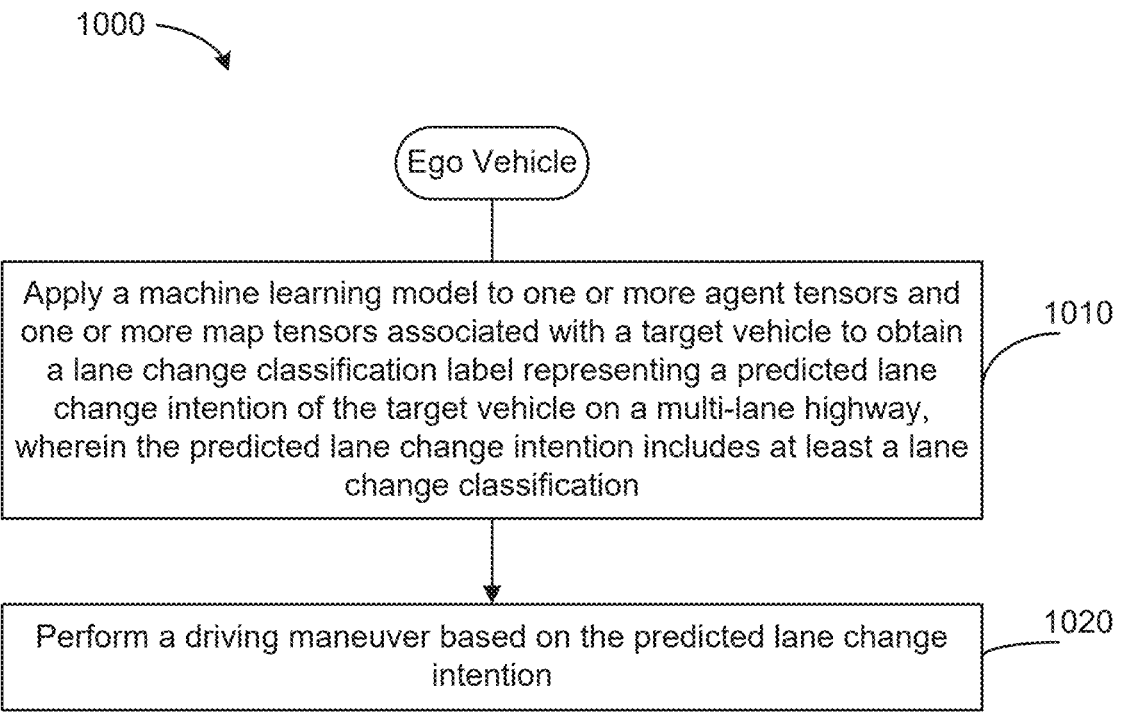
FIG. 10 illustrates an example method of drive trajectory prediction, according to aspects of the disclosure.

FIG. 10 illustrates an example method 1000 of drive trajectory prediction, according to aspects of the disclosure. In an aspect, method 1000 may be performed by an ego vehicle (e.g., any of the vehicles described herein).

At 1010, the ego vehicle applies a machine learning model (e.g., as illustrated in FIG. 7) to one or more agent tensors and one or more map tensors associated with a target vehicle to obtain a lane change classification label representing a predicted lane change intention of the target vehicle on a multi-lane highway, wherein the predicted lane change intention includes at least a lane change classification. In an aspect, operation 1010 may be performed by the one or more WWAN transceivers 330, the one or more short-range wireless transceivers 340, the one or more processors 306, memory 304, and/or drive policy component 318, any or all of which may be considered means for performing this operation.

At 1020, the ego vehicle performs a driving maneuver based on the predicted lane change intention. In an aspect, operation 1020 may be performed by the one or more WWAN transceivers 330, the one or more short-range wireless transceivers 340, the one or more processors 306, memory 304, and/or drive policy component 318, any or all of which may be considered means for performing this operation.

As will be appreciated, a technical advantage of the method 1000 is improved trajectory prediction of target agents/vehicles, and thereby, improved autonomous driving performance. More specifically, the method 1000 can be used to predict lane changes for vehicles around the ego vehicle very early on without resulting in a high false positive rate. The map representation is also very compact, allowing a relatively small model to be trained and achieving efficient inference times. Auto-labeling lane changes is relatively straightforward, and thus, generating data for such a lane change prediction task is similarly straightforward. Predicting lane changes early on, especially lane changes cutting in ahead of the ego vehicle and at merges, helps the planning module plan better and safer trajectories, thereby improving autonomous driving performance.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of drive trajectory prediction performed by an ego vehicle, comprising: applying a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and performing a driving maneuver based on the predicted lane change intention.

Clause 2. The method of clause 1, wherein the one or more agent tensors represent a plurality of features of at least the target vehicle and one or more neighbor vehicles of the target vehicle over a most recent period of time.

Clause 3. The method of clause 2, wherein the plurality of features comprises: current x coordinates of the target vehicle and the one or more neighbor vehicles, current y coordinates of the target vehicle and the one or more neighbor vehicles, previous x coordinates of the target vehicle and the one or more neighbor vehicles, previous y coordinates of the target vehicle and the one or more neighbor vehicles, x-axis velocity values of the target vehicle and the one or more neighbor vehicles, y-axis velocity values of the target vehicle and the one or more neighbor vehicles, angular velocity values of the target vehicle and the one or more neighbor vehicles, acceleration values of the target vehicle and the one or more neighbor vehicles, blinker states of the target vehicle and the one or more neighbor vehicles, a time offset between current and previous positions of the target vehicle and the one or more neighbor vehicles, flags indicating a presence of the target vehicle and the one or more neighbor vehicles, or any combination thereof.

Clause 4. The method of clause 3, wherein a length of the most recent period of time is one second.

Clause 5. The method of any of clauses 1 to 4, wherein the one or more map tensors represent map context information around the target vehicle.

Clause 6. The method of clause 5, wherein the map context information comprises: map lane center points for a current lane of the target vehicle, map lane center points for a lane to the left of the target vehicle, map lane center points for a lane to the right of the target vehicle, or any combination thereof.

Clause 7. The method of any of clauses 1 to 6, wherein the machine learning model is an encoder-decoder machine learning model.

Clause 8. The method of clause 7, wherein an encoder side of the encoder-decoder machine learning model comprises: an agent encoding module, a map encoding module, and an aggregation module.

Clause 9. The method of clause 8, wherein the agent encoding module comprises a self-attention module.

Clause 10. The method of any of clauses 8 to 9, wherein the aggregation module aggregates results of the agent encoding module and the map encoding module.

Clause 11. The method of any of clauses 8 to 10, wherein the aggregation module comprises a map attention module and a cross attention module.

Clause 12. The method of clause 11, wherein: the aggregation module further comprises a multi-layer perception (MLP) layer, and the MLP layer outputs results of the aggregation module.

Clause 13. The method of any of clauses 7 to 12, wherein a decoder side of the encoder-decoder machine learning model comprises: one or more MLP layers that output the lane change classification label.

Clause 14. The method of any of clauses 1 to 13, wherein the predicted lane change intention further includes one or more predicted lane change trajectories associated with the lane change classification.

Clause 15. The method of any of clauses 1 to 14, wherein the lane change classification label represents one of: a lane change left, a lane change right, or no lane change.

Clause 16. The method of any of clauses 1 to 15, wherein the driving maneuver comprises: a lane change left, a lane change right, or no lane change.

Clause 17. An ego vehicle, comprising: one or more memories; one or more transceivers; and one or more processors communicatively coupled to the one or more memories and the one or more transceivers, the one or more processors, either alone or in combination, configured to: apply a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and perform a driving maneuver based on the predicted lane change intention.

Clause 18. The ego vehicle of clause 17, wherein the one or more agent tensors represent a plurality of features of at least the target vehicle and one or more neighbor vehicles of the target vehicle over a most recent period of time.

Clause 19. The ego vehicle of clause 18, wherein the plurality of features comprises: current x coordinates of the target vehicle and the one or more neighbor vehicles, current y coordinates of the target vehicle and the one or more neighbor vehicles, previous x coordinates of the target vehicle and the one or more neighbor vehicles, previous y coordinates of the target vehicle and the one or more neighbor vehicles, x-axis velocity values of the target vehicle and the one or more neighbor vehicles, y-axis velocity values of the target vehicle and the one or more neighbor vehicles, angular velocity values of the target vehicle and the one or more neighbor vehicles, acceleration values of the target vehicle and the one or more neighbor vehicles, blinker states of the target vehicle and the one or more neighbor vehicles, a time offset between current and previous positions of the target vehicle and the one or more neighbor vehicles, flags indicating a presence of the target vehicle and the one or more neighbor vehicles, or any combination thereof.

Clause 20. The ego vehicle of clause 19, wherein a length of the most recent period of time is one second.

Clause 21. The ego vehicle of any of clauses 17 to 20, wherein the one or more map tensors represent map context information around the target vehicle.

Clause 22. The ego vehicle of clause 21, wherein the map context information comprises: map lane center points for a current lane of the target vehicle, map lane center points for a lane to the left of the target vehicle, map lane center points for a lane to the right of the target vehicle, or any combination thereof.

Clause 23. The ego vehicle of any of clauses 17 to 22, wherein the machine learning model is an encoder-decoder machine learning model.

Clause 24. The ego vehicle of clause 23, wherein an encoder side of the encoder-decoder machine learning model comprises: an agent encoding module, a map encoding module, and an aggregation module.

Clause 25. The ego vehicle of clause 24, wherein the agent encoding module comprises a self-attention module.

Clause 26. The ego vehicle of any of clauses 24 to 25, wherein the aggregation module aggregates results of the agent encoding module and the map encoding module.

Clause 27. The ego vehicle of any of clauses 24 to 26, wherein the aggregation module comprises a map attention module and a cross attention module.

Clause 28. The ego vehicle of clause 27, wherein: the aggregation module further comprises a multi-layer perception (MLP) layer, and the MLP layer outputs results of the aggregation module.

Clause 29. The ego vehicle of any of clauses 23 to 28, wherein a decoder side of the encoder-decoder machine learning model comprises: one or more MLP layers that output the lane change classification label.

Clause 30. The ego vehicle of any of clauses 17 to 29, wherein the predicted lane change intention further includes one or more predicted lane change trajectories associated with the lane change classification.

Clause 31. The ego vehicle of any of clauses 17 to 30, wherein the lane change classification label represents one of: a lane change left, a lane change right, or no lane change.

Clause 32. The ego vehicle of any of clauses 17 to 31, wherein the driving maneuver comprises: a lane change left, a lane change right, or no lane change.

Clause 33. An ego vehicle, comprising: means for applying a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and means for performing a driving maneuver based on the predicted lane change intention.

Clause 34. The ego vehicle of clause 33, wherein the one or more agent tensors represent a plurality of features of at least the target vehicle and one or more neighbor vehicles of the target vehicle over a most recent period of time.

Clause 35. The ego vehicle of clause 34, wherein the plurality of features comprises: current x coordinates of the target vehicle and the one or more neighbor vehicles, current y coordinates of the target vehicle and the one or more neighbor vehicles, previous x coordinates of the target vehicle and the one or more neighbor vehicles, previous y coordinates of the target vehicle and the one or more neighbor vehicles, x-axis velocity values of the target vehicle and the one or more neighbor vehicles, y-axis velocity values of the target vehicle and the one or more neighbor vehicles, angular velocity values of the target vehicle and the one or more neighbor vehicles, acceleration values of the target vehicle and the one or more neighbor vehicles, blinker states of the target vehicle and the one or more neighbor vehicles, a time offset between current and previous positions of the target vehicle and the one or more neighbor vehicles, flags indicating a presence of the target vehicle and the one or more neighbor vehicles, or any combination thereof.

Clause 36. The ego vehicle of clause 35, wherein a length of the most recent period of time is one second.

Clause 37. The ego vehicle of any of clauses 33 to 36, wherein the one or more map tensors represent map context information around the target vehicle.

Clause 38. The ego vehicle of clause 37, wherein the map context information comprises: means for mapping lane center points for a current lane of the target vehicle, means for mapping lane center points for a lane to the left of the target vehicle, means for mapping lane center points for a lane to the right of the target vehicle, or any combination thereof.

Clause 39. The ego vehicle of any of clauses 33 to 38, wherein the machine learning model is an encoder-decoder machine learning model.

Clause 40. The ego vehicle of clause 39, wherein an encoder side of the encoder-decoder machine learning model comprises: an agent encoding module, a map encoding module, and an aggregation module.

Clause 41. The ego vehicle of clause 40, wherein the agent encoding module comprises a self-attention module.

Clause 42. The ego vehicle of any of clauses 40 to 41, wherein the aggregation module aggregates results of the agent encoding module and the map encoding module.

Clause 43. The ego vehicle of any of clauses 40 to 42, wherein the aggregation module comprises a map attention module and a cross attention module.

Clause 44. The ego vehicle of clause 43, wherein: the aggregation module further comprises a multi-layer perception (MLP) layer, and the MLP layer outputs results of the aggregation module.

Clause 45. The ego vehicle of any of clauses 39 to 44, wherein a decoder side of the encoder-decoder machine learning model comprises: one or more MLP layers that output the lane change classification label.

Clause 46. The ego vehicle of any of clauses 33 to 45, wherein the predicted lane change intention further includes one or more predicted lane change trajectories associated with the lane change classification.

Clause 47. The ego vehicle of any of clauses 33 to 46, wherein the lane change classification label represents one of: a lane change left, a lane change right, or no lane change.

Clause 48. The ego vehicle of any of clauses 33 to 47, wherein the driving maneuver comprises: a lane change left, a lane change right, or no lane change.

Clause 49. A non-transitory computer-readable medium storing computer-executable instructions that, when executed by an ego vehicle, cause the ego vehicle to: apply a machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification; and perform a driving maneuver based on the predicted lane change intention.

Clause 50. The non-transitory computer-readable medium of clause 49, wherein the one or more agent tensors represent a plurality of features of at least the target vehicle and one or more neighbor vehicles of the target vehicle over a most recent period of time.

Clause 51. The non-transitory computer-readable medium of clause 50, wherein the plurality of features comprises: current x coordinates of the target vehicle and the one or more neighbor vehicles, current y coordinates of the target vehicle and the one or more neighbor vehicles, previous x coordinates of the target vehicle and the one or more neighbor vehicles, previous y coordinates of the target vehicle and the one or more neighbor vehicles, x-axis velocity values of the target vehicle and the one or more neighbor vehicles, y-axis velocity values of the target vehicle and the one or more neighbor vehicles, angular velocity values of the target vehicle and the one or more neighbor vehicles, acceleration values of the target vehicle and the one or more neighbor vehicles, blinker states of the target vehicle and the one or more neighbor vehicles, a time offset between current and previous positions of the target vehicle and the one or more neighbor vehicles, flags indicating a presence of the target vehicle and the one or more neighbor vehicles, or any combination thereof.

Clause 52. The non-transitory computer-readable medium of clause 51, wherein a length of the most recent period of time is one second.

Clause 53. The non-transitory computer-readable medium of any of clauses 49 to 52, wherein the one or more map tensors represent map context information around the target vehicle.

Clause 54. The non-transitory computer-readable medium of clause 53, wherein the map context information comprises: map lane center points for a current lane of the target vehicle, map lane center points for a lane to the left of the target vehicle, map lane center points for a lane to the right of the target vehicle, or any combination thereof.

Clause 55. The non-transitory computer-readable medium of any of clauses 49 to 54, wherein the machine learning model is an encoder-decoder machine learning model.

Clause 56. The non-transitory computer-readable medium of clause 55, wherein an encoder side of the encoder-decoder machine learning model comprises: an agent encoding module, a map encoding module, and an aggregation module.

Clause 57. The non-transitory computer-readable medium of clause 56, wherein the agent encoding module comprises a self-attention module.

Clause 58. The non-transitory computer-readable medium of any of clauses 56 to 57, wherein the aggregation module aggregates results of the agent encoding module and the map encoding module.

Clause 59. The non-transitory computer-readable medium of any of clauses 56 to 58, wherein the aggregation module comprises a map attention module and a cross attention module.

Clause 60. The non-transitory computer-readable medium of clause 59, wherein: the aggregation module further comprises a multi-layer perception (MLP) layer, and the MLP layer outputs results of the aggregation module.

Clause 61. The non-transitory computer-readable medium of any of clauses 55 to 60, wherein a decoder side of the encoder-decoder machine learning model comprises: one or more MLP layers that output the lane change classification label.

Clause 62. The non-transitory computer-readable medium of any of clauses 49 to 61, wherein the predicted lane change intention further includes one or more predicted lane change trajectories associated with the lane change classification.

Clause 63. The non-transitory computer-readable medium of any of clauses 49 to 62, wherein the lane change classification label represents one of: a lane change left, a lane change right, or no lane change.

Clause 64. The non-transitory computer-readable medium of any of clauses 49 to 63, wherein the driving maneuver comprises: a lane change left, a lane change right, or no lane change.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data mag-netically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "includ-ing," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used inter-changeably with "and/or," unless explicitly stated otherwise (e.g., if used in combination with "either" or "only one of") or the alternatives are mutually exclusive (e.g., "one or more" should not be interpreted as "one and more"). Fur-thermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. An ego vehicle, comprising:
one or more memories;
one or more transceivers; and
one or more processors communicatively coupled to the one or more memories and the one or more transceiv-ers, the one or more processors, either alone or in combination, configured to:
apply an encoder-decoder machine learning model to one or more agent tensors and one or more map tensors associated with a target vehicle to obtain a lane change classification label representing a pre-dicted lane change intention of the target vehicle on a multi-lane highway, wherein the predicted lane change intention includes at least a lane change classification, and wherein a decoder side of the encoder-decoder machine learning model outputs the lane change classification label; and
perform a driving maneuver based on the predicted lane change intention.

2. The ego vehicle of claim 1, wherein the one or more agent tensors represent a plurality of features of at least the target vehicle and one or more neighbor vehicles of the target vehicle over a most recent period of time.

3. The ego vehicle of claim 2, wherein the plurality of features comprises:
current x coordinates of the target vehicle and the one or more neighbor vehicles,
current y coordinates of the target vehicle and the one or more neighbor vehicles,
previous x coordinates of the target vehicle and the one or more neighbor vehicles,
previous y coordinates of the target vehicle and the one or more neighbor vehicles,
x-axis velocity values of the target vehicle and the one or more neighbor vehicles,
y-axis velocity values of the target vehicle and the one or more neighbor vehicles,
angular velocity values of the target vehicle and the one or more neighbor vehicles,
acceleration values of the target vehicle and the one or more neighbor vehicles,
blinker states of the target vehicle and the one or more neighbor vehicles,
a time offset between current and previous positions of the target vehicle and the one or more neighbor vehicles,
flags indicating a presence of the target vehicle and the one or more neighbor vehicles, or
any combination thereof.

4. The ego vehicle of claim 3, wherein a length of the most recent period of time is one second.

5. The ego vehicle of claim 1, wherein the one or more map tensors represent map context information around the target vehicle.

6. The ego vehicle of claim 5, wherein the map context information comprises:
map lane center points for a current lane of the target vehicle,
map lane center points for a lane to the left of the target vehicle,
map lane center points for a lane to the right of the target vehicle, or
any combination thereof.

7. The ego vehicle of claim 1, wherein an encoder side of the encoder-decoder machine learning model comprises:
an agent encoding module,
a map encoding module, and
an aggregation module.

8. The ego vehicle of claim 7, wherein the agent encoding module comprises a self-attention module.

9. The ego vehicle of claim 7, wherein the aggregation module aggregates results of the agent encoding module and the map encoding module.

10. The ego vehicle of claim 7, wherein the aggregation module comprises a map attention module and a cross attention module.

11. The ego vehicle of claim 10, wherein:

the aggregation module further comprises a multi-layer perception (MLP) layer, and the MLP layer outputs results of the aggregation module.

12. The ego vehicle of claim 1, wherein the decoder side of the encoder-decoder machine learning model comprises:

one or more MLP layers that output the lane change classification label.

13. The ego vehicle of claim 1, wherein the predicted lane change intention further includes one or more predicted lane change trajectories associated with the lane change classification.

14. The ego vehicle of claim 1, wherein the lane change classification label represents one of:

a lane change left, a lane change right, or no lane change.

15. The ego vehicle of claim 1, wherein the driving maneuver comprises:

a lane change left, a lane change right, or no lane change.

16. A method of drive trajectory prediction performed by an ego vehicle, comprising:

applying an encoder-decoder machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification, and wherein a decoder side of the encoder-decoder machine learning model outputs the lane change classification label; and performing a driving maneuver based on the predicted lane change intention.

17. The method of claim 16, wherein the one or more agent tensors represent a plurality of features of at least the target vehicle and one or more neighbor vehicles of the target vehicle over a most recent period of time.

18. The method of claim 17, wherein the plurality of features comprises:

current x coordinates of the target vehicle and the one or more neighbor vehicles, current y coordinates of the target vehicle and the one or more neighbor vehicles, previous x coordinates of the target vehicle and the one or more neighbor vehicles, previous y coordinates of the target vehicle and the one or more neighbor vehicles, x-axis velocity values of the target vehicle and the one or more neighbor vehicles, y-axis velocity values of the target vehicle and the one or more neighbor vehicles, angular velocity values of the target vehicle and the one or more neighbor vehicles, acceleration values of the target vehicle and the one or more neighbor vehicles, blinker states of the target vehicle and the one or more neighbor vehicles, a time offset between current and previous positions of the target vehicle and the one or more neighbor vehicles, flags indicating a presence of the target vehicle and the one or more neighbor vehicles, or any combination thereof.

19. The method of claim 16, wherein the one or more map tensors represent map context information around the target vehicle.

20. The method of claim 19, wherein the map context information comprises:

map lane center points for a current lane of the target vehicle, map lane center points for a lane to the left of the target vehicle, map lane center points for a lane to the right of the target vehicle, or any combination thereof.

21. The method of claim 16, wherein an encoder side of the encoder-decoder machine learning model comprises:

an agent encoding module, a map encoding module, and an aggregation module.

22. The method of claim 21, wherein the agent encoding module comprises a self-attention module.

23. The method of claim 21, wherein the aggregation module aggregates results of the agent encoding module and the map encoding module.

24. The method of claim 21, wherein the aggregation module comprises a map attention module and a cross attention module.

25. The method of claim 16, wherein the decoder side of the encoder-decoder machine learning model comprises:

one or more MLP layers that output the lane change classification label.

26. The method of claim 16, wherein the predicted lane change intention further includes one or more predicted lane change trajectories associated with the lane change classification.

27. An ego vehicle, comprising:

means for applying an encoder-decoder machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification, and wherein a decoder side of the encoder-decoder machine learning model outputs the lane change classification label; and means for performing a driving maneuver based on the predicted lane change intention.

28. A non-transitory computer-readable medium storing computer-executable instructions that, when executed by an ego vehicle, cause the ego vehicle to:

apply an encoder-decoder machine learning model to one or more agent tensors and one or more map tensors associated with a target vehicle to obtain a lane change classification label representing a predicted lane change intention of the target vehicle on a multi-lane highway, wherein the predicted lane change intention includes at least a lane change classification, and wherein a decoder side of the encoder-decoder machine learning model outputs the lane change classification label; and perform a driving maneuver based on the predicted lane change intention.

* * * * *